U S009856957B2

(12) United States Patent
Van Mil et al.

(10) Patent No.: US 9,856,957 B2
(45) Date of Patent: Jan. 2, 2018

(54) LINEAR ACTUATOR

(71) Applicant: Robert Bosch GmbH, Stuttgart (DE)

(72) Inventors: Roel Van Mil, Boxtel (NL); Evert Mulder, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 14/951,402

(22) Filed: Nov. 24, 2015

(65) Prior Publication Data
US 2016/0153477 A1 Jun. 2, 2016

(30) Foreign Application Priority Data

Nov. 27, 2014 (DE) .......................... 10 2014 224 259

(51) Int. Cl.
| | | |
|---|---|---|
| *F01B 9/00* | (2006.01) | |
| *F16H 25/24* | (2006.01) | |
| *F15B 15/22* | (2006.01) | |
| *F16H 25/20* | (2006.01) | |
| *F15B 15/14* | (2006.01) | |

(52) U.S. Cl.
CPC ........... *F16H 25/24* (2013.01); *F15B 15/227* (2013.01); *F15B 15/228* (2013.01); *F16H 25/2021* (2013.01); *F15B 2015/1495* (2013.01); *F16H 2025/204* (2013.01); *F16H 2025/2037* (2013.01); *F16H 2025/2096* (2013.01)

(58) Field of Classification Search
CPC .............. F15B 15/08; F15B 2015/1495; F15B 15/227; F15B 15/228; F16H 25/24
See application file for complete search history.

(56) References Cited

U.S. PATENT DOCUMENTS

| | | | | |
|---|---|---|---|---|
| 3,162,092 A | * | 12/1964 | Corwin | ................... F01B 11/02 91/26 |
| 3,823,758 A | * | 7/1974 | Heese | ................... F15B 15/088 160/188 |
| 4,279,402 A | * | 7/1981 | Wey | ...................... F16K 31/122 173/210 |
| 6,086,059 A | | 7/2000 | Runesson et al. | |

(Continued)

FOREIGN PATENT DOCUMENTS

| | | |
|---|---|---|
| DE | 35 22 449 A1 | 1/1987 |
| DE | 10 2006 008 901 A1 | 8/2007 |

(Continued)

*Primary Examiner* — Michael Leslie
(74) *Attorney, Agent, or Firm* — Maginot, Moore & Beck LLP

(57) ABSTRACT

A linear actuator provided for moving a load includes an actuator housing having a tube and a housing bottom at one end of the tube and a housing head at another end of the tube. The linear actuator further includes a piston guided longitudinally in the actuator housing, and an actuator rod assembled with the piston and configured to protrude out of the actuator housing in a manner which is guided in the housing head. The linear actuator is configured such that reliability of operation is increased and damage of structural parts is largely avoided. The linear actuator achieves these results by virtue of the fact that there is at least one plastically deformable buffer element which can be supported on the housing head and can be deformed in the case of an impact of the piston. The buffer element is configured to convert kinetic energy into deformation work.

20 Claims, 3 Drawing Sheets

(56) References Cited

U.S. PATENT DOCUMENTS

| | | | | |
|---|---|---|---|---|
| 7,566,092 B2* | 7/2009 | Paton | .................. | B60J 5/101 |
| | | | | 296/106 |
| 9,689,480 B2* | 6/2017 | Van Mil | .................. | F16H 25/20 |

FOREIGN PATENT DOCUMENTS

| DE | 10 2006 010 800 A1 | 9/2007 |
|---|---|---|
| DE | 10 2008 049 149 A1 | 1/2010 |

* cited by examiner

LINEAR ACTUATOR

This application claims priority under 35 U.S.C. §119 to patent application no. DE 10 2014 224 259.2, filed on Nov. 27, 2014 in Germany, the disclosure of which is incorporated herein by reference in its entirety.

BACKGROUND

The disclosure relates to a linear actuator which serves to move a load. One preferred field of use is movement systems such as driving simulators and flight simulators, in which a cab is mounted on a platform which can be moved in six degrees of freedom by a total of six identical linear actuators. Linear actuators are known which have an actuator housing with a tube, with a housing bottom at the one end of the tube and with a housing head at the other end of the tube, a piston which is guided longitudinally in the actuator housing, and an actuator rod which is assembled with the piston and protrudes out of the actuator housing in a manner which is guided on the housing head.

Linear actuators of this type are often electromechanical linear actuators, there being a threaded spindle which can be driven rotatably by an electric motor, is mounted rotatably in the housing bottom of the actuator housing and extends in the interior of the actuator housing from the housing bottom in the direction of the housing head, the piston comprising a spindle nut which is in engagement with the threaded spindle, and the actuator rod being hollow and the threaded spindle dipping into the hollow actuator rod.

It is also known to equip a linear actuator of this type with means for compensating for the static load, up to 75% of the static load being supported, for example, by way of said means. The remaining proportion of the load is absorbed by the threaded spindle. If a plurality of linear actuators are provided to carry the load, each linear actuator of course accepts only a certain proportion of the load. If desired, up to 100% of the static load can also be compensated for.

In an emergency or in the case of incorrect control, it can occur that, depending on the movement direction and structural design, the piston impacts against the housing bottom or against the housing head or a flange which is fastened to the outside of the actuator rod impacts against the housing head. Here, damage of structurally essential parts can occur which is such that said parts have to be replaced. On account of the damage, the actuator can also be blocked, with the result that emergency operation is no longer possible. There is also the risk that people are injured who are situated in the cab of the simulator and who are subjected to large negative accelerations in the case of an impact of the piston or the actuator rod.

SUMMARY

The disclosure is based on the object of configuring a linear actuator, in such a way that the reliability of operation is increased and damage of structural parts and injury of people are largely avoided.

In a linear actuator of the generic type, the object is achieved in a first way by virtue of the fact that there is at least one plastically deformable buffer element which can be supported on the housing head on its inner side which faces the interior of the actuator housing and can be deformed in the case of an impact of the piston, kinetic energy being converted into deformation work and, if the buffer element also rebounds somewhat, possibly also potential energy.

In a linear actuator of the generic type, the object is achieved in a second way by virtue of the fact that there is at least one plastically deformable buffer element which can be supported on the housing head on its outer side which faces away from the interior of the actuator housing and can be deformed in the case of an impact of a flange which is fastened to the actuator rod, kinetic energy being converted into deformation work and, if the buffer element also rebounds somewhat, possibly also potential energy.

In the case of a linear actuator according to the disclosure, there is therefore at least one plastically deformable buffer element which can be supported on the housing head and can be deformed in the case of an impact of the piston, kinetic energy being converted into deformation work.

If, in a linear actuator according to the disclosure, the piston impacts the housing head from the inner side or the flange on the actuator rod impacts the housing head from the outer side, the buffer element or elements is/are deformed. The buffer elements therefore form a small crash zone in a similar manner to modern automobiles, within which crash zone the movement energy of the actuator rod with the piston and with the load is converted into deformation work, and the actuator rod is braked to a standstill in a safe way. After an incident of this type, the linear actuator can still be actuated, since no structurally important parts are damaged. The deformed buffer elements are replaced immediately after an above-described incident.

The buffer element or the buffer elements is/are configured in such a way that the construction and people are subjected only to a maximum force or deceleration. Here, the deceleration depends on the area extent and on the strength of the buffer material. A greater area is required with a softer or weaker material, in order to achieve the same damping action as with a firmer or stronger material. As an alternative, the path, on which the buffers are deformed, can be extended, in order to absorb the same amount of energy. A longer path with a softer or weaker material influences the deceleration of the actuator. The optimum maximum force and deceleration can be set by way of the selection of the strength, the area and the deformation path for the buffer elements.

Advantageous refinements of a linear actuator according to the disclosure can be gathered from the subclaims.

An existing plastically deformable buffer element advantageously has a honeycomb-like structure, the cavities of the structure extending in the movement direction of the actuator rod. An aluminum material is preferably used as material for the buffer elements. Honeycomb-like structures made from an aluminum material are known per se as so-called aluminum honeycombs.

A buffer element can be configured as a closed ring which surrounds the actuator rod. A buffer element can also, however, have the shape of an annular segment. In the latter case, it is favorable that a plurality of buffer elements are arranged distributed uniformly over 360° around the actuator rod, in order that the actuator rod is not braked on one side and possibly tilts.

In the context of a compact design of the housing head and therefore of the entire linear actuator, it is advantageous if the buffer elements are situated within the axial extent of a guide bushing for the actuator rod, which guide bushing belongs to the housing head. A certain length is necessary for the guide bushing which usually accommodates guide bands for the actuator rod, one or more sealing rings and a stripper. If the buffer elements are now situated within the axial extent of the guide bushing, the overall length is not influenced by them. In order that this arrangement of the buffer elements is possible, the guide bushing can be displaced axially with respect to the disk in one particularly advantageous development of a linear actuator according to the disclosure.

For buffering a retracting movement of the actuator rod, an outer annular space is then formed in a simple way, on that side of the disk which faces away from the interior space of the actuator housing, radially between said disk and the guide bushing, in which outer annular space at least one buffer element is arranged, and into which outer annular space a flange on the actuator rod can dip. During dipping, the flange displaces the guide bushing into the actuator housing.

For buffering of an extending movement of the actuator rod, one buffer element or a plurality of buffer elements is/are arranged in an inner annular space depending on the required force and deceleration, which inner annular space is delimited axially by the disk and the bushing flange which the guide bushing has at an axial spacing from the disk in front of that side of the disk which faces the interior space of the actuator housing. If the interior space of the actuator housing is loaded with pressure in order to compensate for a static load, the bushing flange is pressed by the pressure against the buffer elements which are situated in the inner annular space. In this way, the guide bushing is held in a defined axial position. At the same time, the buffer elements are secured captively.

In order that the housing pressure acts on the guide bushing on the entire annular area between the actuator rod and the tube of the actuator housing, the inner annular space is connected to atmosphere. A sealing ring between the bushing flange and the tube then prevents oil or gas being lost through the gap between the bushing flange and the tube and the pressure in the housing dropping.

BRIEF DESCRIPTION OF THE DRAWINGS

One exemplary embodiment of a linear actuator according to the disclosure is shown in the drawings. The disclosure will now be explained in greater detail using said drawings, in which.

DETAILED DESCRIPTION

Figure 1:
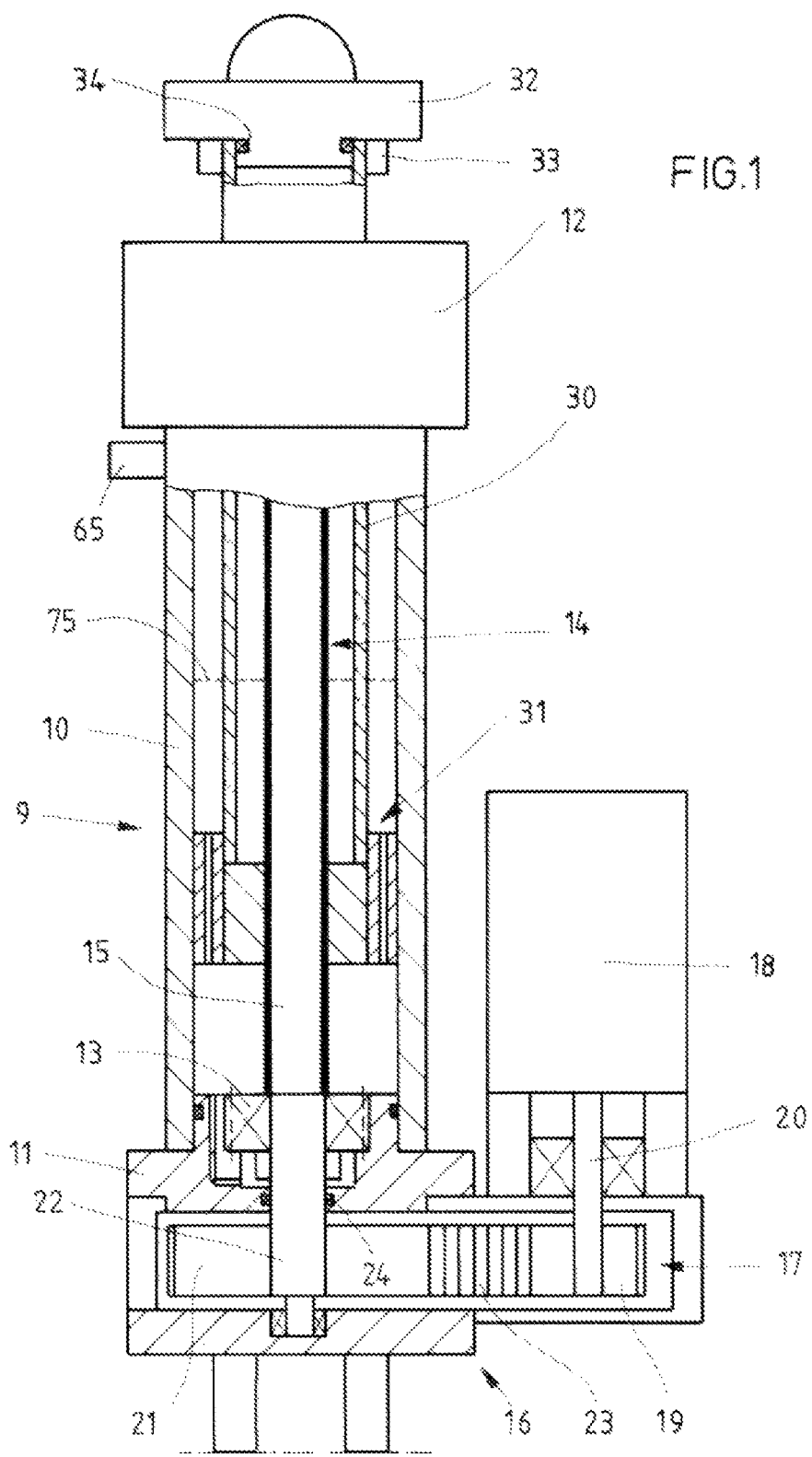
FIG. 1 shows the linear actuator partially in a longitudinal section, and in a greatly simplified illustration.

As can be seen from FIG. 1, the linear actuator has an actuator housing 9 with a tube 10, at the one end of which a housing bottom 11 is situated and at the other end of which a housing head 12 is situated. A threaded spindle 14 is mounted rotatably in the housing bottom via an anti-friction bearing 13, which threaded spindle 14 extends with a section 15 which is provided with a thread from the anti-friction bearing into the interior space of the actuator housing 9 in an axially non-displaceable manner. Together with further components, the housing bottom 11 at the same time forms a housing 16 for a toothed belt mechanism 17, via which the threaded spindle 14 can be driven rotationally by an electric motor 18 which is arranged in parallel next to the actuator housing 9. The belt mechanism 17 consists of a first toothed pulley wheel 19 which is seated fixedly so as to rotate with it on the shaft 20 of the electric motor 18 which protrudes into the housing 16, a second toothed pulley wheel 21 which is larger than the first pulley wheel 19 and is seated fixedly so as to rotate with it on a shaft journal 22 of the threaded spindle 14 which protrudes into the housing 16, and a toothed belt 23 which runs over the two pulley wheels 19 and 21. The passage of the shaft journal 22 is sealed by way of a shaft sealing ring 24.

Furthermore, the linear actuator has an actuator rod 30 which is configured as a tube, is fastened to a piston 31 in the interior of the actuator housing 9 and protrudes through the housing head 12 to the outside. That end of the hollow actuator rod which is situated outside the actuator housing 9 is closed by way of an adapter 32 which is centered with a collar in the actuator rod and is screwed to a flange 33 which is screwed onto the actuator rod. A sealing ring 34 is arranged between the collar of the adapter 32 and the actuator rod 30, by way of which sealing ring 34 the interior of the actuator rod 30 is sealed to the outside.

Figure 2:
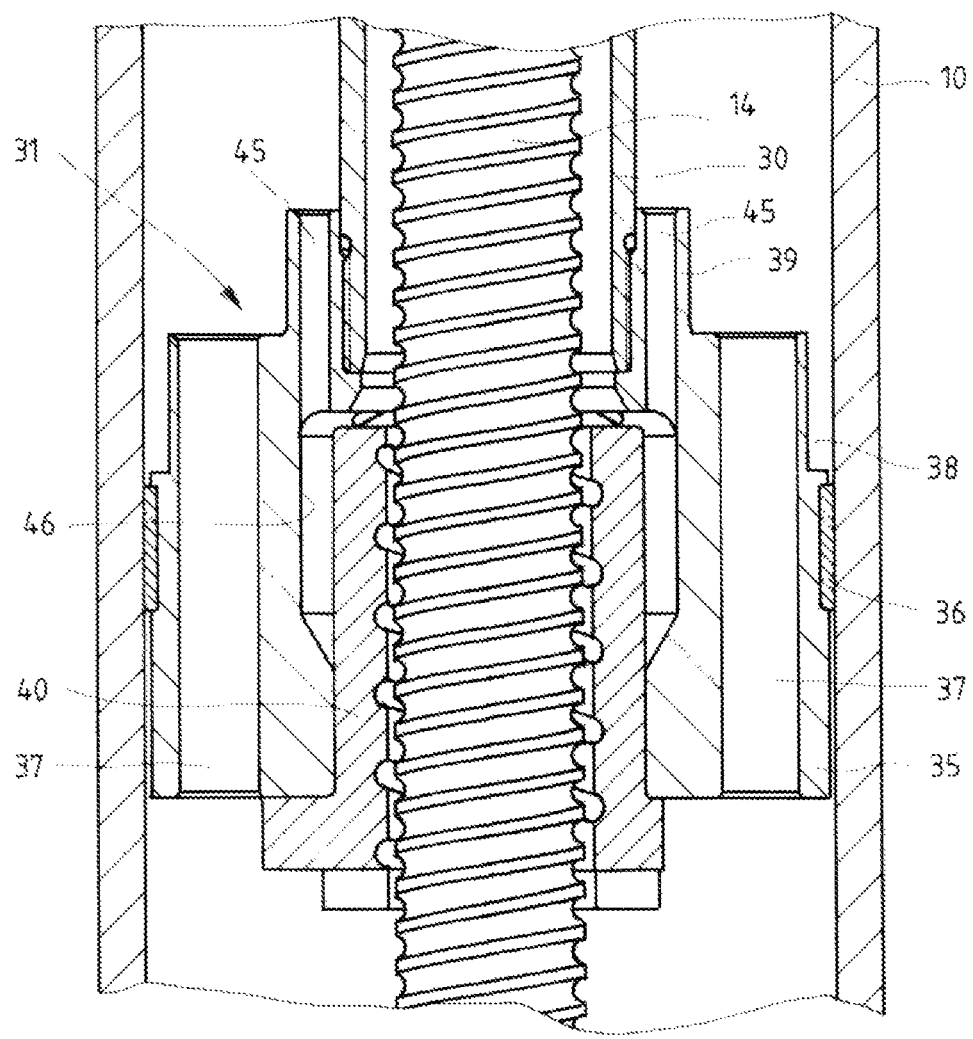
FIG. 2 shows a longitudinal section through the linear actuator in the region of the piston on an enlarged scale.
Figure 3:
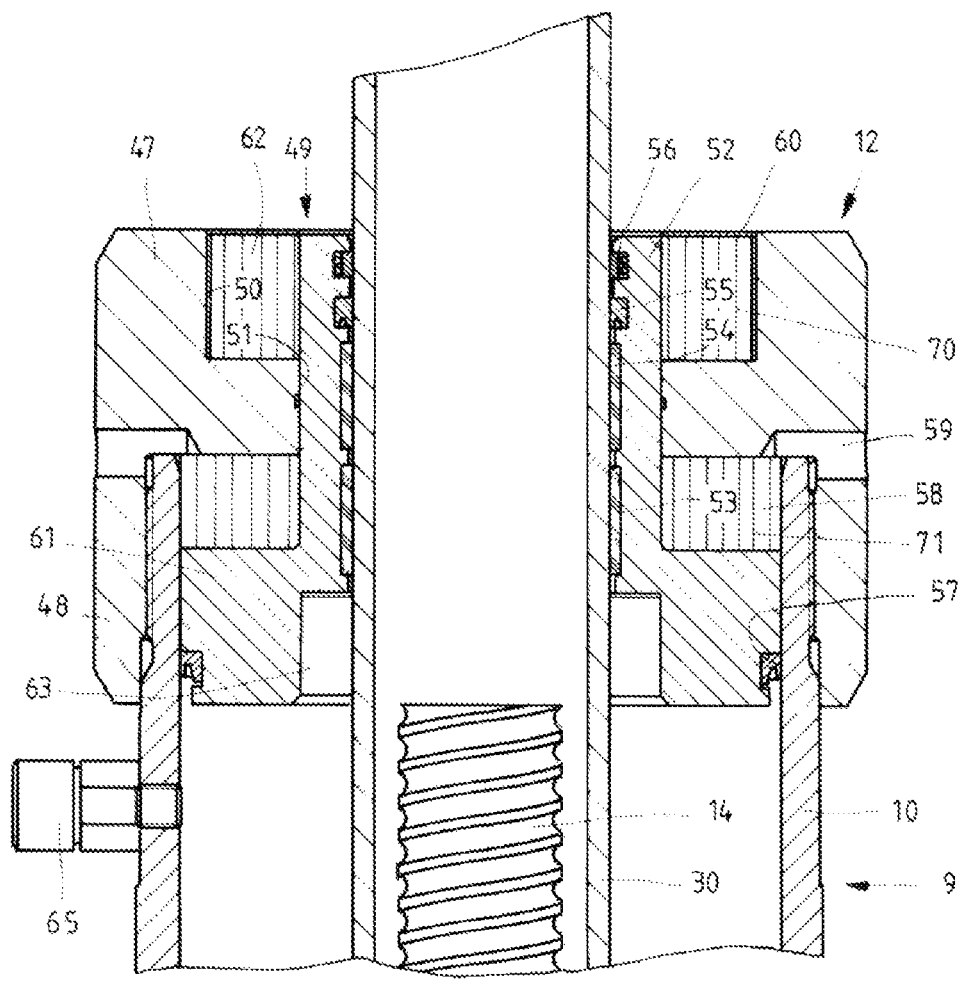
FIG. 3 shows a longitudinal section through the linear actuator in the region of the housing head of the actuator housing on an enlarged scale.

The construction of the piston 31 is apparent in greater detail from FIG. 2. According to said figure, the piston 31 has a sleeve-like guide part 35 with an outer circumferential groove, into which a guide band 36 is inserted, by way of which the piston 31 is guided longitudinally in the actuator housing 9. A plurality of bores 37 which run in the axial direction are situated in the guide part, through which bores 37 that part volume of the interior of the actuator housing 9 which is situated between the wall of the actuator housing and the actuator rod and the part volume on the other side of the piston 31 are open fluidically with respect to one another. From the end side which points in the same direction as the actuator rod 30, a turned groove 38 is made in the guide part 35 up to a small spacing from the groove which receives the guide band 36, with the result that there is an annular clearance between the actuator housing 9 and the piston 31.

In the center, the sleeve-like guide part 35 of the piston 31 has a projecting collar 39 which is provided with an internal thread and into which the actuator rod 30 which is provided with an external thread over a defined section from its piston-side end is screwed as far as an inwardly projecting shoulder of the guide part 35. The connection is advantageously secured by way of a threaded pin (not shown in greater detail) which is radially screwed into the collar 39.

From the side which faces away from the actuator rod 30, a spindle nut 40 which is configured as a flange bushing is inserted into the guide part 35 of the piston 31 and is connected fixedly to the guide part 35. With an internal thread, the spindle nut 40 interacts with the thread of the threaded spindle 14. During operation, the unit comprising actuator rod 30 and piston 31 including the spindle nut is secured against rotation by way of the fastening of the actuator rod on a load. A rotational movement of the threaded spindle 14 therefore leads to an axial movement of piston and actuator rod. The threaded spindle 14 extends through the spindle nut 40 into the actuator rod to a greater or lesser extent depending on the position of the actuator rod 30.

Distributed at an identical angular offset with respect to one another, a plurality of axial bores 45 are made in the collar 39 of the guide part 35, which axial bores 45 open on the inside into a hollowed-out portion 46 which surrounds the spindle nut over part of its longitudinal extent. The inner end side of the spindle nut is at a spacing from the one end of the hollowed-out portion 46, with the result that there is an open siphon-like fluidic connection between the interior space of the actuator rod 30 and the interior space of the actuator housing 9 via the axial bores 45 and the hollowed-out portion 46.

The housing head 12 of the actuator housing 9 comprises a disk 47 which is screwed onto the tubular part of the actuator housing 9 with a collar 48 which is provided with an internal thread. The disk 47 has a stepped through bore 49 with a section 50 of large diameter adjacently to the outer end side which faces away from the interior of the actuator housing 9 and with a section 51 of smaller diameter adjacently to the inner end side which faces the interior of the actuator housing 9. The diameter of the section 51 is larger than the external diameter of the actuator rod 30, however. From the inner end side, a guide bushing 52 which is configured as a flange bushing with a bushing flange 61 is inserted into the disk 47, the diameter of which in front of the bushing flange is slightly smaller than the diameter of the through bore 49 in the region of the section 51, and which guide bushing 52 reaches as far as that end side of the disk 47 which faces away from the interior of the actuator housing 9. On the inside, the guide bushing 52 is provided with annular grooves, into which two guide bands 53 and 54 which interact with the actuator rod, a sealing ring 55 which seals the gap between the guide bushing and the actuator rod in a gastight manner, and a stripper 56 are inserted. The outer diameter of the bushing flange 61 of the guide bushing 52 is slightly smaller than the inner diameter of the tube 10 of the actuator housing 9. The gap is sealed by way of a sealing ring 57. On account of the selected dimensions, there is an annular space 62 between the guide bushing 52 and the wall of the section 50 of the through bore 49, which annular space 62 is covered with a thin plate 60, in order that it does not become contaminated.

The bushing flange 61 of the guide bushing 52 is at a spacing from that end side of the disk 47 which faces the interior of the actuator housing 9, with the result that there is an annular clearance 58 between the disk 47 and the bushing flange 61. Said clearance 58 is ventilated to the outside via radial bores 59 in the disk 47. The inner diameter of the bushing flange 61 is somewhat larger than the outer diameter of the collar 39 on the piston 31, with the result that there is an annular space 63 between the bushing flange 61 and the actuator rod, into which annular space 63 the collar 39 can dip. The annular space 63 and the collar 39 on the piston therefore allow the provision of the necessary thread length for fastening the actuator rod, without the stroke of the actuator rod 30 being shortened by the bushing flange 61.

A plurality of (four in the present case, for example, for a defined payload) honeycomb-like annular segments 70 which are spaced apart from one another uniformly and are made from an aluminum material are inserted into the annular space 62, which annular segments 70 are held in their positions distributed over the circumference of the annular space 62 on their radial outer side by way of an adhesive on the disk 47. A plurality of (four in the present case, for example) honeycomb-like annular segments 71 which are spaced apart from one another uniformly and are made from an aluminum material are inserted into the annular space 58, which annular segments 71 are held in their positions distributed over the circumference of the annular space 58 on their radial outer side by way of an adhesive on the tube 10. The annular segments 70 and 71 serve as deformation elements for the conversion of kinetic energy into deformation energy if the actuator rod moves in an uncontrolled manner in an emergency or in the case of a malfunction of the linear actuator. The annular segments 70 and 71 are therefore the buffer elements which are denoted thus further above in the exemplary embodiment. The annular segments 71 are designed differently from the annular segments 70, and have, for example, a shorter maximum deformation path than the annular segments 70. In the case of a greater payload, more than four (for example, eight) annular segments can be situated in the annular spaces 58 and 62, with an area which is then twice as large as in the case of four annular segments.

Other cross-sectional shapes than the shape of an annular segment are also conceivable for the buffer elements, for example a circular-cylindrical shape or a parallelepiped shape.

If the actuator rod 30 retracts in an uncontrolled manner in the case of a malfunction, the flange 33 impacts on the guide bushing 52 and via the plate 60 on the deformation elements which are situated in the annular space 62, and is decelerated, the guide bushing 52 being pushed inward and the deformation elements being deformed. If the actuator rod 30 extends in an uncontrolled manner in the case of a malfunction, the piston 31 impacts on the bushing flange 61 of the guide bushing 52 and displaces the bushing flange and therefore the guide bushing counter to the force which is necessary for deforming the deformation elements which are situated in the annular space 58. Here, air which is situated in the annular space can escape through the bores 59.

The buffer force depends on what angular region of the annular spaces 58 and 62 is filled by deformation elements and how the deformation elements are configured. If an annular space is to be filled completely, this can be achieved by way of a single annular deformation element.

The entire interior space of the linear actuator is filled with dry nitrogen and oil, there being no dividing element which would separate the nitrogen and the oil from one another. In the case of a completely retracted actuator rod, approximately 60% of the interior space is filled with oil and approximately 40% is filled with nitrogen. In FIG. 1, the oil level in the case of a vertical operating position of the linear actuator is indicated by the dashed line 75. The nitrogen is filled via a valve 65 and is subjected to a pressure which is selected depending on the magnitude of the load. The relatively small volume of nitrogen means that the inner pressure in the actuator is discernibly higher in the case of a retracted actuator rod than in the case of an extended actuator rod. The acceleration and extension of the actuator rod counter to the weight of the payload are assisted by the high inner pressure in the actuator. During retraction of the actuator rod, the weight acts in the movement direction of the actuator rod. The lower inner pressure in the actuator inhibits the acceleration of the payload to a lesser extent.

The inner pressure also acts on the guide bushing 52 and secures it in an axial position, in which the bushing flange 61 bears against the deformation elements 71 which are situated in the annular space 58 and, via said deformation elements 71, against the disk 47. The guide bushing 52 can therefore run easily in the disk 47 and in the tube 10.

The linear actuator is preferably provided for applications, in which only limited angles with respect to the vertical are inclined, the actuator rod protruding upward out of the actuator housing, with the result that the oil is situated above the housing bottom 11. The gas is situated above the oil. During operation, the piston 31 can be dipped completely into the oil or can be situated completely or partially above the oil level. As a result of the siphon-like design of the connection between the interior space of the actuator housing 9 with the axial bores 45 and as a result of the turned groove 38 on the outside of the guide part 35 of the piston 31, two storage spaces for oil are provided, in which oil is provided even when the piston 31 is situated above the oil level. It is therefore ensured, even if the piston 31 moves in the gas, that the threads of the threaded spindle 14 and the spindle nut 40 and the guide band 36 are lubricated with oil.

LIST OF DESIGNATIONS

9 Actuator housing
10 Tube of 9
11 Housing bottom
12 Housing head
13 Anti-friction bearing
14 Threaded spindle
15 Section of 14
16 Housing
17 Toothed belt mechanism
18 Electric motor
19 Pulley wheel
20 Shaft of 18
21 Pulley wheel
22 Shaft journal of 14
23 Toothed belt
24 Shaft sealing ring
30 Actuator rod
31 Piston
32 Adapter
33 Flange
34 Sealing ring
35 Guide part of 31
36 Guide band
37 Bores
38 Turned groove
39 Collar of 35
40 Spindle nut
45 Axial bores in 35
46 Hollowed-out portion in 35
47 Disk of 12
48 Collar of 47
49 Through bore in 47
50 Section of 49
51 Section of 49
52 Guide bushing
53 Guide band
54 Guide band
55 Sealing ring
56 Stripper
57 Sealing ring
58 Annular space
59 Radial bores
60 Plate
61 Bushing flange on 52
62 Annular space
63 Annular space
65 Valve
70 Buffer elements
71 Buffer elements
75 Oil level

What is claimed is:

1. A linear actuator for moving a load comprising:
an actuator housing including a tube, a housing bottom at one end of the tube, and a housing head at another end of the tube, the housing head defining an inner side facing an interior space of the actuator housing;
a piston guided longitudinally in the actuator housing;
an actuator rod assembled with the piston and configured to protrude out of the actuator housing in a manner which is guided in the housing head; and
at least one plastically deformable buffer element supported on the inner side of the housing head, the at least one plastically deformable buffer element configured (i) to be deformed in case of an impact of the piston, and (ii) to convert kinetic energy at least partially into deformation work.

2. The linear actuator according to patent claim 1, wherein:
the at least one plastically deformable buffer element includes an existing plastically deformable buffer element having a honeycomb-like structure, and
cavities of the honeycomb-like structure extend in a movement direction of the actuator rod.

3. The linear actuator according to patent claim 2, wherein the existing plastically deformable buffer element consists of an aluminum material.

4. The linear actuator according to patent claim 1, wherein:
the at least one plastically deformable buffer element includes a plurality of plastically deformable buffer elements, and
the plurality of plastically deformable buffer elements is arranged distributed uniformly over 360° around the actuator rod.

5. The linear actuator according to patent claim 1, wherein:
the housing head includes a disk assembled fixedly with the tube, and a guide bushing for the actuator rod,
the guide bushing extends through a central passage of the disk,
the guide bushing projects on at least one side beyond a section of the disk which encloses it tightly, and
the guide bushing is displaceable axially with respect to the disk.

6. The linear actuator according to patent claim 5, wherein:
an outer annular space is formed, on a side of the disk which faces away from the interior space of the actuator housing, radially between the disk and the guide bushing, in which outer annular space at least one buffer element is arranged, and into which outer annular space a flange on the actuator rod is configured to dip.

7. The linear actuator according to patent claim 5, wherein:
the guide bushing has a bushing flange at an axial spacing from the disk in front of a side of the disk which faces the interior space of the actuator housing,
the at least one buffer element is arranged in an inner annular space which is delimited axially by the disk and the bushing flange.

8. The linear actuator according to patent claim 7, wherein the interior space of the actuator housing is loaded with pressure.

9. The linear actuator according to patent claim 8, further comprising:
a sealing ring situated between the bushing flange and the tube,
wherein the inner annular space is open toward the atmosphere.

10. The linear actuator according to patent claim 1, further comprising:
a rotatably drivable threaded spindle mounted rotatably in the housing bottom and configured to extend in the interior of the actuator housing from the housing bottom in the direction of the housing head,
wherein the piston includes a spindle nut in engagement with the threaded spindle, and wherein the actuator rod is hollow and the threaded spindle dips into the hollow actuator rod.

11. A linear actuator for moving a load comprising:
an actuator housing including a tube, a housing bottom at one end of the tube, and a housing head at another end of the tube, the housing head defining an outer side facing away from an interior space of the actuator housing;
a piston guided longitudinally in the actuator housing;
an actuator rod assembled with the piston and configured to protrude out of the actuator housing in a manner which is guided in the housing head;
a flange fastened to the actuator rod; and
at least one plastically deformable buffer element supported on the outer side of the housing head, the at least one plastically deformable buffer element configured (i) to be deformed in case of an impact of the flange, and (ii) to convert kinetic energy at least partially into deformation work.

12. The linear actuator according to patent claim 11, wherein:
the at least one plastically deformable buffer element includes an existing plastically deformable buffer element having a honeycomb-like structure, and
cavities of the honeycomb-like structure extend in a movement direction of the actuator rod.

13. The linear actuator according to patent claim 12, wherein the existing plastically deformable buffer element consists of an aluminum material.

14. The linear actuator according to patent claim 11, wherein:
the at least one plastically deformable buffer element includes a plurality of plastically deformable buffer elements, and
the plurality of plastically deformable buffer elements is arranged distributed uniformly over 360° around the actuator rod.

15. The linear actuator according to patent claim 11, wherein:
the housing head includes a disk assembled fixedly with the tube, and a guide bushing for the actuator rod,
the guide bushing extends through a central passage of the disk,
the guide bushing projects on at least one side beyond a section of the disk which encloses it tightly, and
the guide bushing is displaceable axially with respect to the disk.

16. The linear actuator according to patent claim 15, wherein:
an outer annular space is formed, on a side of the disk which faces away from the interior space of the actuator housing, radially between the disk and the guide bushing, in which outer annular space at least one buffer element is arranged, and into which outer annular space a flange on the actuator rod is configured to dip.

17. The linear actuator according to patent claim 15, wherein:
the guide bushing has a bushing flange at an axial spacing from the disk in front of a side of the disk which faces the interior space of the actuator housing,
the at least one buffer element is arranged in an inner annular space which is delimited axially by the disk and the bushing flange.

18. The linear actuator according to patent claim 17, wherein the interior space of the actuator housing is loaded with pressure.

19. The linear actuator according to patent claim 18, further comprising:
a sealing ring situated between the bushing flange and the tube,
wherein the inner annular space is open toward the atmosphere.

20. The linear actuator according to patent claim 11, further comprising:
a rotatably drivable threaded spindle mounted rotatably in the housing bottom and configured to extend in the interior of the actuator housing from the housing bottom in the direction of the housing head,
wherein the piston includes a spindle nut in engagement with the threaded spindle, and
wherein the actuator rod is hollow and the threaded spindle dips into the hollow actuator rod.

* * * * *